US011184647B1

(12) United States Patent
Khalid et al.

(10) Patent No.: US 11,184,647 B1
(45) Date of Patent: Nov. 23, 2021

(54) METHODS AND SYSTEMS FOR INTERACTIVE CONTENT DELIVERY WITHIN A LIVE VIDEO STREAM

(71) Applicant: Verizon Patent and Licensing Inc., Basking Ridge, NJ (US)

(72) Inventors: Mohammad Raheel Khalid, Budd Lake, NJ (US); William Robert Davey, Somerville, NJ (US); Vito Joseph Messina, Somerville, NJ (US); Carl L. Keifer, III, Pittsburgh, PA (US); Oliver S. Castaneda, West Henrietta, NY (US); Scott David Brown, Grayson, GA (US)

(73) Assignee: Verzon Patent and Licensing Inc., Basking Nidge, NJ (US)

( * ) Notice: Subject to any disclaimer, the term of this patent is extended or adjusted under 35 U.S.C. 154(b) by 0 days.

(21) Appl. No.: 17/008,080

(22) Filed: Aug. 31, 2020

(51) Int. Cl.
*H04N 21/2187* (2011.01)
*H04N 21/643* (2011.01)
*H04N 21/8545* (2011.01)
*H04N 21/81* (2011.01)
*H04N 21/478* (2011.01)
*H04N 21/234* (2011.01)

(52) U.S. Cl.
CPC ... *H04N 21/2187* (2013.01); *H04N 21/23418* (2013.01); *H04N 21/4781* (2013.01); *H04N 21/643* (2013.01); *H04N 21/8166* (2013.01); *H04N 21/8545* (2013.01)

(58) Field of Classification Search
CPC ............. H04N 21/2187; H04N 21/643; H04N 21/8545; H04N 21/8166; H04N 21/4781; H04N 21/23418
See application file for complete search history.

(56) References Cited

U.S. PATENT DOCUMENTS

| | | | |
|---|---|---|---|
| 2010/0273553 A1* | 10/2010 | Zalewski | H04N 21/4781 463/31 |
| 2017/0308681 A1* | 10/2017 | Gould | H04L 63/08 |
| 2019/0281100 A1* | 9/2019 | Lo | H04N 21/812 |

* cited by examiner

*Primary Examiner* — Yassin Alata

(57) ABSTRACT

An illustrative interactive content delivery system includes an interactive content player device (player device) and an interactive content provider system (provider system). As the provider system transmits a live video stream to the player device, the player device detects a first event marker in the live video stream, accesses an executable data object including data representative of an interactive content instance, and executes, based on the executable data object, the interactive content instance in accordance with interactive input provided by a user of the player device. During the executing of the interactive content instance, the player device detects a second event marker in the live video stream and subsequently discontinues the executing of the interactive content instance. Corresponding methods and systems are disclosed for both the provider system and the player device of the interactive content delivery system.

20 Claims, 9 Drawing Sheets

METHODS AND SYSTEMS FOR INTERACTIVE CONTENT DELIVERY WITHIN A LIVE VIDEO STREAM

BACKGROUND INFORMATION

Media content consumed by users of media player devices may be characterized by various different properties. For example, one such property may be whether the media content is interactive (e.g., presented in a manner that accounts for input from the user such that the presentation of the media content may vary depending on user input). Live video content may serve as an example of media content that is typically non-interactive. That is, the video content (e.g., a broadcast of a real-world event such as a sporting event) may be transmitted from a provider system to a media player device to be presented "as-is" to a user of the media player device (i.e., such that user input is neither queried nor accounted for by the video content). In contrast, video games and certain extended reality experiences (e.g., augmented reality experiences, virtual reality experiences, etc.) may serve as examples of media content that is interactive. That is, content associated with these games and/or experiences may be presented in a manner that is completely under the control of the user, or at least accounts for user input to some extent.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
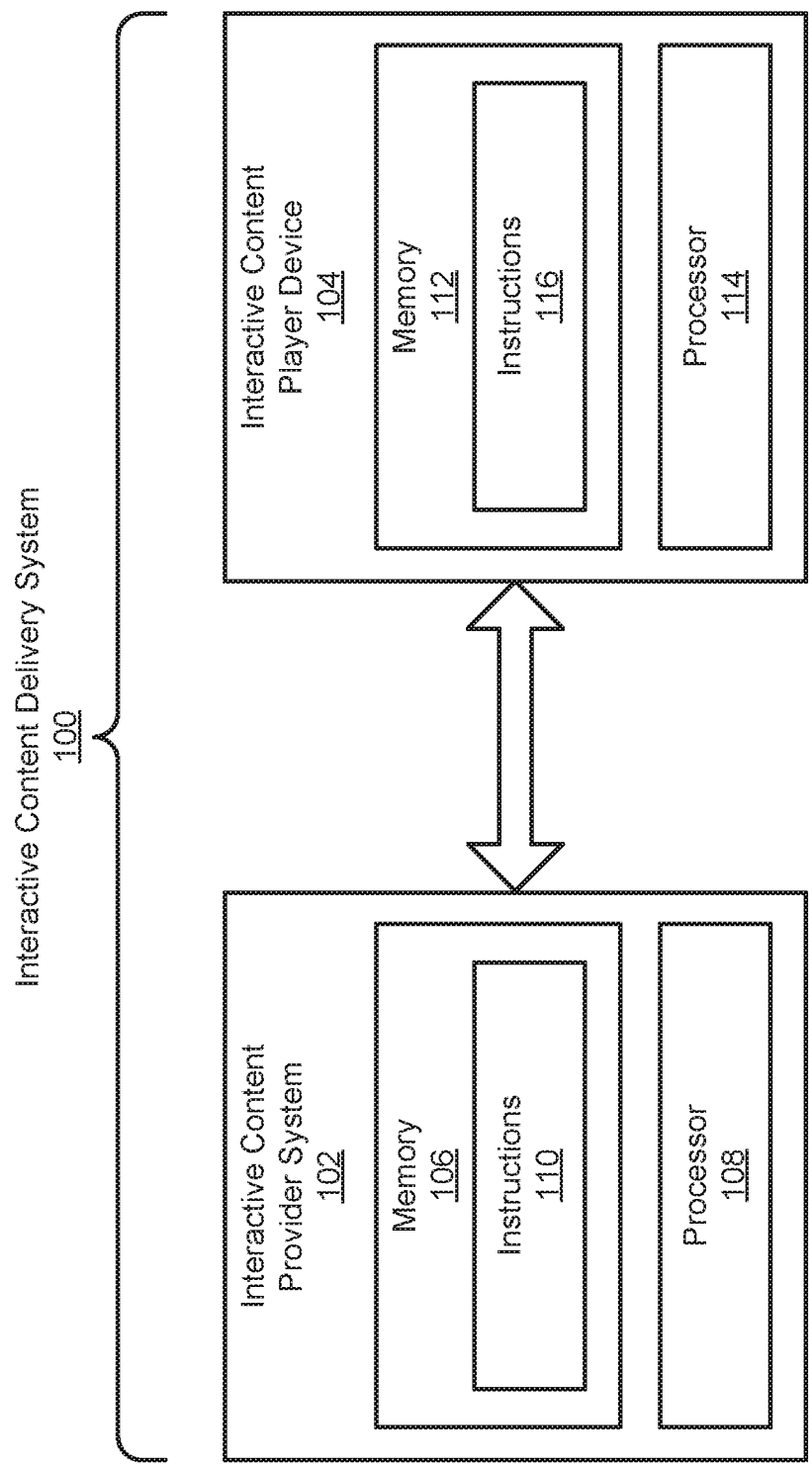
FIG. 1 shows an illustrative interactive content delivery system that includes an interactive content provider system and an interactive content player device according to embodiments described herein.

Methods and systems for interactive content delivery within a live video stream are described herein. As used herein, live video streams may refer to any instance of streaming data as may be used to exchange real-time media content data, such as video data representing video content that depicts a live event (e.g., a real-world event, a virtual event, etc.). One data format used for live video streams, for example, is the Hyper-Text Transport Protocol (HTTP) Live Stream (HLS) format. HLS video streams have conventionally been used to deliver non-interactive media content such as, for example, video content depicting a live event such as a professional sporting event (e.g., a live basketball game, etc.) in real time.

Methods and systems described herein relate to how live video streams such as HLS video streams and/or other such streams conventionally used for non-interactive media content may be used to also deliver other types of content that have not been delivered using these live video streams. For example, as will be described in more detail below, interactive content such as video games (e.g., mini-games, advanced games, etc.), extended reality assets (e.g., interactive objects to be included within an extended reality experience), and/or other real-time computer applications, may be delivered by way of live video streams together with, or instead of, the non-interactive content that these live video streams have conventionally delivered. For instance, methods and systems described herein may allow for a user viewing non-interactive content (e.g., a live basketball game being viewed on a two-dimensional (2D) device screen or being experienced in virtual reality by way of a head-mounted device) to be presented with interactive content at various points during the program (e.g., during timeouts, half-time, or other points in the game at which a break may be desired or appropriate). Instead of being presented with video content displaying a traditional commercial advertisement during half-time of a sporting event, for instance, methods and systems described herein may allow for a user to be presented with an interactive game or other interactive content. For example, if the video content is a professional basketball game, interactive content presented during half-time or a commercial break may be a free-throw shooting mini-game during which the user is invited to provide user input to attempt to direct a basketball into a basketball hoop displayed on the screen.

Methods and systems described herein for interactive content delivery within a live video stream may provide advantages and benefits to users and providers of the interactive content. For example, users (e.g., consumers experiencing a live video stream by way of a media player device) may enjoy novel, entertaining, meaningful, and/or otherwise beneficial types of media content in place of (or in addition to) media content the users are accustomed to experiencing (e.g., non-interactive promotional videos during commercial breaks, etc.). Similarly, providers of the interactive content may benefit from being able to offer novel, innovative, and interesting media content to users who the content providers seek to entertain and edify such that the users refrain from pursuing competing media content options. In some cases, new revenue streams for marketing and advertising (e.g., in-stream purchasing, game-based advertising formats, etc.) be enabled by these methods and systems as well.

Various technical benefits may also be provided by methods and systems described herein. For example, as will be described in more detail below, one advantage of delivering interactive content within a live video stream in accordance with methods and systems described herein is that conventional communication standards may be employed such that the provider and user benefits described above may be brought about with minimal or no changes to the existing data delivery architecture. For instance, an interactive content player device may use a lightweight plugin module that allows the interactive content player device to properly intake and process a live video stream that adheres to a standard such as the HLS standard mentioned above. Moreover, markers and metadata within an HLS video stream may also adhere to known standards in certain examples, such as the ANSI/SCTE-35 standard for inline video cueing.

Another technical benefit of methods and systems described herein may arise from the data format in which interactive content instances (e.g., video games, extended reality assets, etc.) are stored, exchanged, and executed. For example, a data object that includes the data representative of the interactive content instance may be implemented as an executable data object that includes data that is "flattened" so as to be stored and transferred in an executable form that is the same form in which the data will exists in memory during execution by the interactive content player device. Various such data objects may be embedded directly into the live video stream, or may be stored elsewhere and linked to within the live video stream. In some examples, data objects may be provided on an as-needed or on-demand manner from a local server or a multi-access server (e.g., a multi-access edge computing (MEC) system implemented on a provider network of a wireless carrier, etc.) that is configured to provide low latency and high responsiveness to enhance the user experience of a particular interactive content instance.

Various specific embodiments will now be described in detail with reference to the figures. It will be understood that the specific embodiments described below are provided as non-limiting examples of how various novel and inventive principles may be applied in various situations. Additionally, it will be understood that other examples not explicitly described herein may also be captured by the scope of the claims set forth below. Methods and systems for interactive content delivery within a live video stream described herein may provide any of the benefits mentioned above, as well as various additional and/or alternative benefits that will be described and/or made apparent below.

FIG. 1 shows an illustrative interactive content delivery system 100 (delivery system 100) configured to provide interactive content delivery within a live video stream in accordance with principles described herein. As shown, delivery system 100 includes an interactive content provider system 102 (provider system 102) and an interactive content player device 104 (player device 104) that may be communicatively coupled with one another in any suitable way (e.g., including by way of a network as will be illustrated and described in more detail below).

Delivery system 100 and components thereof including provider system 102 and player device 104 may be implemented by computer resources such as processors, memory devices, storage devices, communication interfaces, and so forth. For example, provider system 102 may be implemented by localized servers or distributed computing systems operated by a communications provider (e.g., MEC servers operated by a wireless carrier entity), distributed computing systems operated by a cloud-computing provider (e.g., multi-access cloud servers), or other suitable computing systems. Player device 104 may be implemented by computing systems such as mobile devices (e.g., smartphones, tablet devices, etc.), personal computers, smart televisions, extended reality player devices, or other suitable computing systems.

As shown, provider system 102 may include, without limitation, a memory 106 and a processor 108 selectively and communicatively coupled to one another. Memory 106 and processor 108 may each include or be implemented by computer hardware that is configured to store and/or execute computer software. Various other components of computer hardware and/or software not explicitly shown in FIG. 1 may also be included within provider system 102. In some examples, memory 106 and processor 108 may be distributed between multiple devices and/or multiple locations as may serve a particular implementation.

Memory 106 may store and/or otherwise maintain executable data used by processor 108 to perform any of the functionality described herein to be performed by provider system 102. For example, memory 106 may store instructions 110 that may be executed by processor 108. Memory 106 may be implemented by one or more memory or storage devices, including any memory or storage devices described herein, that are configured to store data in a transitory or non-transitory manner. Instructions 110 may be executed by processor 108 to cause provider system 102 to perform any of the functionality described herein. Instructions 110 may be implemented by any suitable application, software, script, code, and/or other executable data instance. Additionally, memory 106 may also maintain any other data accessed, managed, used, and/or transmitted by processor 108 in a particular implementation.

Processor 108 may be implemented by one or more computer processing devices, including general purpose processors (e.g., central processing units (CPUs), graphics processing units (GPUs), microprocessors, etc.), special purpose processors (e.g., application-specific integrated circuits (ASICs), field-programmable gate arrays (FPGAs), etc.), or the like. Using processor 108 (e.g., when processor 108 is directed to perform operations represented by instructions 110 stored in memory 106), provider system 102 may perform functions associated with the data transmission side of interactive content delivery within a live video stream as described herein and/or as may serve a particular implementation.

Figure 2:
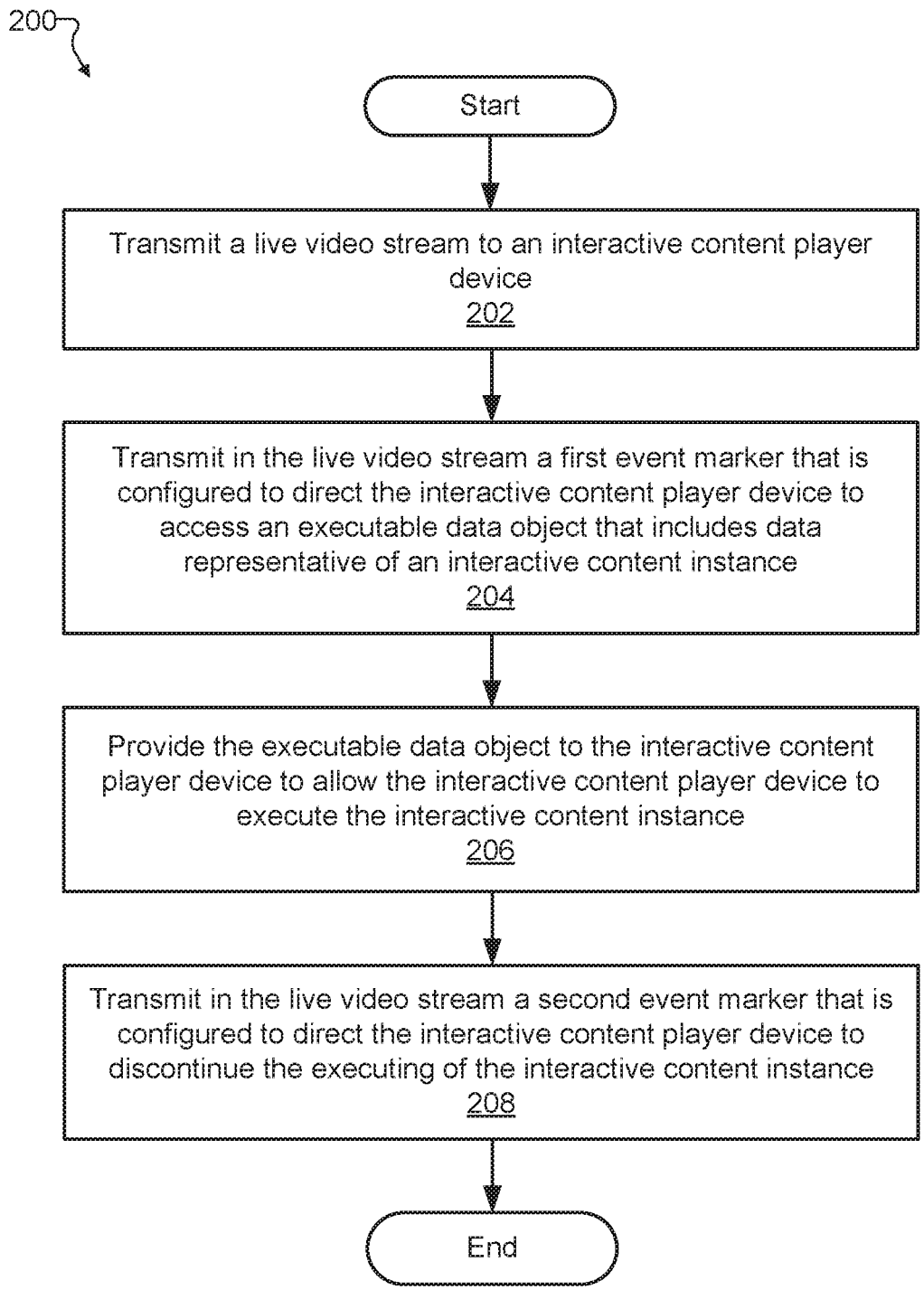
FIG. 2 shows an illustrative method for interactive content delivery within a live video stream that may be performed by the interactive content provider system of FIG. 1 according to embodiments described herein.

As one example of functionality that processor 108 may perform, FIG. 2 shows an illustrative method 200 for implementing the data transmission side of interactive content delivery within a live video stream in accordance with principles described herein. While FIG. 2 shows illustrative operations according to one embodiment, other embodiments may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated. One or more of the operations shown in FIG. 2 may be performed by an interactive content provider system such as provider system 102 and/or any implementation thereof.

In some examples, the operations of FIG. 2 may be performed in real-time so as to deliver, provide, receive, process, and/or use data described herein immediately as the data is generated, updated, changed, exchanged, or otherwise becomes available. As a result, system 100 may be configured to perform interactive content delivery within a live video stream as events depicted in the live video stream are unfolding (e.g., live during the event). In these examples, the live video stream may be said to depict a real-time representation of the event if the representation is provided immediately and without undue delay, even if it is not possible for there to be absolutely zero delay. For example, a real-time representation of a live sporting event may be delayed by several seconds or even minutes in certain instances. Each of operations 202-208 of method 200 will now be described in more detail.

At operation 202, provider system 102 may transmit a live video stream to an interactive content player device such as player device 104. For example, as mentioned above, the live video stream may be implemented as an HLS video stream or another established or custom stream of data configured to stream live video data. In some examples, the live video stream may be transmitted by way of a communication network that may include, for instance, portions of the Internet and/or portions of a provider network such as a wireless carrier network (e.g., a 4G or 5G cellular data network, etc.) that is provided by a wireless provider entity. Additional details relating to live video streams will be described and illustrated below.

At operation 204, provider system 102 may transmit a first event marker in the live video stream being transmitted as part of operation 202. The first event marker may be configured to direct the interactive content player device to access an executable data object that includes data representative of an interactive content instance. In certain examples, as mentioned above, the first event marker may be implemented using an established standard such as the ANSI/SCTE-35 standard for inline video cueing. While this standard has been designed and used conventionally for cueing video content to be inserted into a stream (e.g., for advertisements from local affiliates to be inserted into a national broadcast, etc.), the standard may provide various advantages described above when leveraged for the novel purpose of signaling that a real-time application (e.g., any of the interactive content instances described herein) is to be accessed and executed during a particular time period. Event markers such as this first event marker will be described in more detail below.

At operation 206, provider system 102 may provide the executable data object to the interactive content player device to allow the interactive content player device to execute the interactive content instance based on the executable data object. As mentioned above, the executable data object may include data that is flattened into a form that the data is to be stored in memory of the interactive content player device (e.g., memory 112, as will be described in more detail below) during execution of the interactive content instance by the interactive content player device (e.g., by processor 114, as will be described in more detail below). The interactive content instance may be executed in accordance with interactive input provided by a user of the interactive content player device, in contrast to standard video content that would conventionally be signaled by markers such as ANSI/SCTE-35 markers.

The providing of the executable data object at operation 206 may be performed in any suitable manner. For instance, in certain implementations, some or all of the data of the executable data object may be embedded directly into the live video stream being transmitted at operation 202. In the same or other implementations, some or all of the data of the executable data object may be stored elsewhere (e.g., in an asset server, etc.) and may be linked to by data links within the live video stream being transmitted at operation 202. In certain cases, certain executable data objects or parts of an executable data object may be embedded within the live video stream while other executable data objects or parts of the executable data object may be linked so that assets may be provided to the interactive content player device as needed or as appropriate (e.g., based on the interactive user input). Examples of interactive content that may be provided within executable data objects will be described in more detail below.

At operation 208, provider system 102 may transmit a second event marker in the live video stream being transmitted as part of operation 202. For example, provider system 102 may transmit the second event marker while the interactive content player device is executing the interactive content instance based on the executable data object provided at operation 206. As with the first event marker transmitted at operation 204, the second event marker may be implemented by an ANSI/SCTE-35 video cue or another suitable data marker as may serve a particular implementation. As will be described in more detail below, the second event marker may be configured to direct the interactive content player device to discontinue the executing of the interactive content instance (e.g., either immediately or after a user indication has been detected, as will be described below).

Returning to FIG. 1, provider system 102 is shown to be communicatively coupled to player device 104 within delivery system 100 as provider system 102 performs the operations described above. As mentioned above, player device 104 may also be implemented by a computing device having similar types of components as provider system 102.

Specifically, as shown, player device 104 may include, without limitation, a memory 112 and a processor 114 selectively and communicatively coupled to one another. Memory 112 and processor 114 may each include or be implemented by computer hardware that is configured to store and/or execute computer software. Various other components of computer hardware and/or software not explicitly shown in FIG. 1 may also be included within player device 104. In some examples, memory 112 and processor 114 may be distributed between multiple devices and/or multiple locations as may serve a particular implementation.

Memory 112 may store and/or otherwise maintain executable data used by processor 114 to perform any of the functionality described herein to be performed by player device 104. For example, memory 112 may store instructions 116 that may be executed by processor 114. Memory 112 may be implemented by one or more memory or storage devices, including any memory or storage devices described herein, that are configured to store data in a transitory or non-transitory manner. Instructions 116 may be executed by processor 114 to cause player device 104 to perform any of the functionality described herein. Instructions 116 may be implemented by any suitable application, software, script, code, and/or other executable data instance. Additionally, memory 112 may also maintain any other data accessed, managed, used, and/or transmitted by processor 114 in a particular implementation.

Similar to processor 108, processor 114 may be implemented by one or more computer processing devices, including general purpose processors (e.g., central processing units (CPUs), graphics processing units (GPUs), microprocessors, etc.), special purpose processors (e.g., application-specific integrated circuits (ASICs), field-programmable gate arrays (FPGAs), etc.), or the like. Using processor 114 (e.g., when processor 114 is directed to perform operations represented by instructions 116 stored in memory 112), player device 104 may perform functions associated with the receiving side of interactive content delivery within a live video stream as described herein and/or as may serve a particular implementation.

Figure 3:
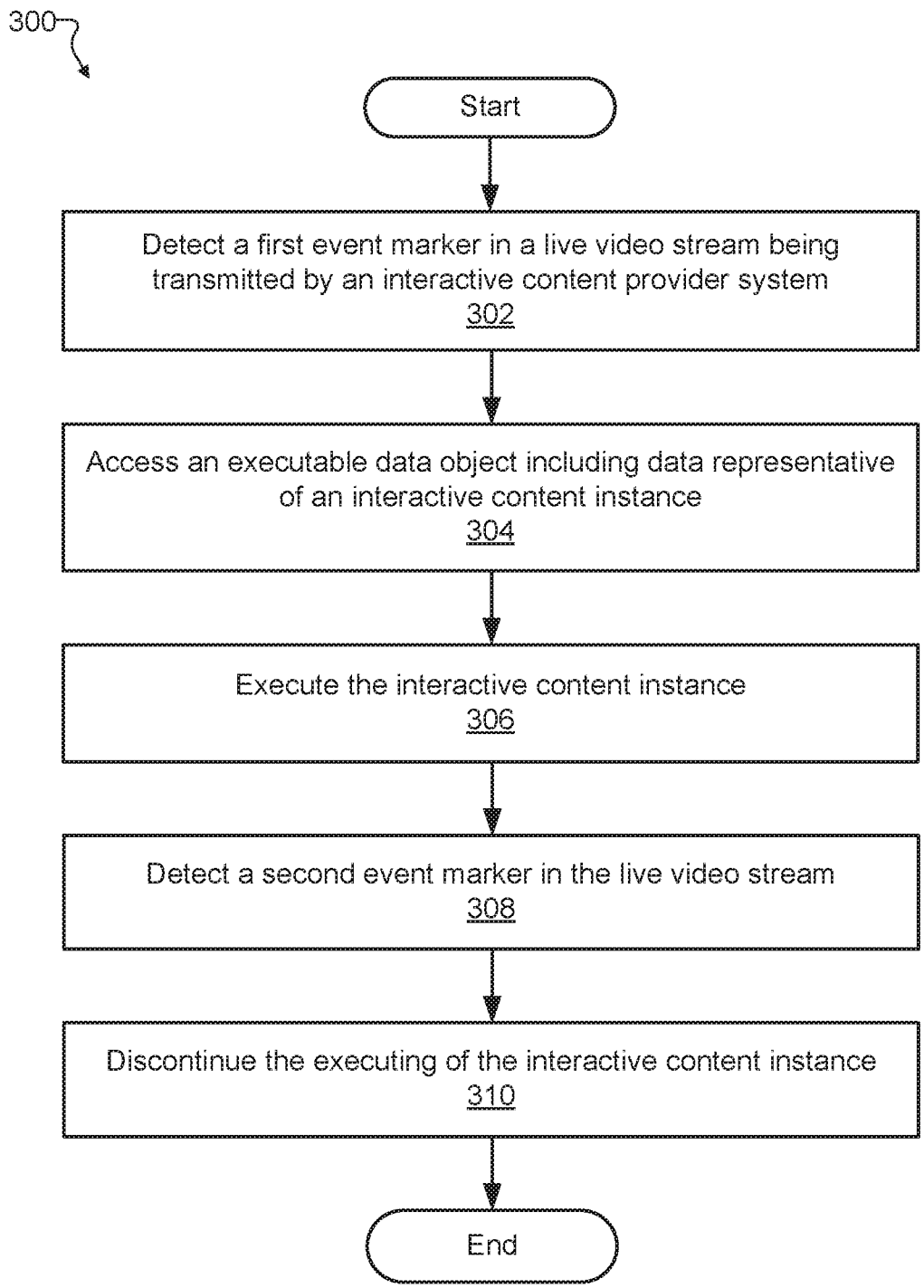
FIG. 3 shows an illustrative method for interactive content delivery within a live video stream that may be performed by the interactive content player device of FIG. 1 according to embodiments described herein.

As one example of functionality that processor 114 may perform, FIG. 3 shows an illustrative method 300 for implementing the data receiving side of interactive content delivery within a live video stream in accordance with principles described herein. While FIG. 3 shows illustrative operations according to one embodiment, other embodiments may omit, add to, reorder, and/or modify any of the operations shown in FIG. 3. In some examples, multiple operations shown in FIG. 3 or described in relation to FIG. 3 may be performed concurrently (e.g., in parallel) with one another, rather than being performed sequentially as illustrated and/or described. One or more of the operations shown in FIG. 3 may be performed by an interactive content player device such as player device 104 and/or any implementation thereof.

As described above in relation to method 200, the operations of method 300 shown in FIG. 3 may be performed in real-time so as to deliver, provide, receive, process, and/or use data described herein immediately as the data is generated, updated, changed, exchanged, or otherwise becomes available. Each of operations 302-310 of method 300 will now be described in more detail.

At operation 302, player device 104 may detect a first event marker in a live video stream being transmitted by an interactive content provider system such as provider system 102. For example, the first event marker detected at operation 302 may be the first event marker transmitted by provider system 102 as described above in relation to operation 204. Similarly, the live video stream may be the live video stream transmitted by provider system 102 as described above in relation to operation 202.

At operation 304, player device 104 may access an executable data object that includes data representative of an interactive content instance. For example, the executable data object accessed at operation 304 may be the executable data object provided by provider system 102 as described above in relation to operation 206, and player device 104 may access the executable data object in a manner that comports with the way that provider system 102 provides the executable data object. For instance, if provider system 102 embeds part or all of the executable data object within the live video stream, player device 104 may perform the accessing of operation 304 by receiving the data embedded within the live video stream (e.g., including, in some examples, by decoding the data, parsing the data, etc.). If, in the same or other examples, provider system 102 includes one or more links to part or all of the executable data object within the live video stream, player device 104 may perform the accessing of operation 304 by retrieving (e.g., requesting and receiving, downloading, etc.) the data from the data location indicated in the one or more links (e.g., from an asset server in certain examples). In some examples, player device 104 may access the executable data object at operation 304 in response to the detecting of the first event marker at operation 302.

At operation 306, player device 104 may execute the interactive content instance based on the executable data object accessed at operation 304. As mentioned above, and due to the interactive nature of the interactive content instance, player device 104 may execute the interactive content instance at operation 306 in accordance with interactive input provided by a user of the player device 104. For example, if the interactive content instance is a mini-game (e.g., a free-throw shooting mini-game presented during half time of a basketball game event, as will be described and illustrated in more detail below), player device 104 may execute the game in accordance with input provided by the user to shoot the ball (e.g., input indicating a horizontal angle at which the basketball is to be thrown, input indicating a vertical angle at which the basketball is to be thrown, input indicating a velocity or power with which the basketball is to be thrown, etc.). While such interaction would not be provided by non-interactive media content conventionally shown in response to event markers (e.g., video advertisements, expert game analysis, etc., presented during the basketball half-time show), player device 104 may be equipped to provide this interactive experience due to the executable nature of the executable data object and the handling of the executable data object by a plugin module executing within player device 104. The interactive experience may also be facilitated and enhanced by powerful resources of a multi-access server (e.g., a MEC server) that may responsively provide data services with low latency as described in more detail below.

At operation 308, player device 104 may detect a second event marker in the live video stream. For example, the second event marker detected at operation 308 may be the second event marker transmitted by provider system 102 as described above in relation to operation 208. Player device 104 may detect the second event marker during the executing of the interactive content instance (e.g., as operation 306 is ongoing). For example, if the interactive content instance is to be presented during a commercial break or half-time show, the second event may be detected when the commercial break or half-time show concludes and the primary event (e.g., the basketball game in this example) is starting back up.

At operation 310, player device 104 may discontinue the executing of the interactive content instance of operation 306. Operation 310 may be performed subsequent to the detecting of the second event marker at operation 308, but may not necessarily be performed immediately subsequent to the marker being detected. For instance, while player device 104 may discontinue executing the interactive content instance immediately and in response to detecting the second event marker in certain implementations and/or scenarios, player device 104 may discontinue executing the interactive content instance at a later time (e.g., after receiving user input indicating that the user wishes to discontinue use of the interactive content instance) in other implementations and/or scenarios. Various such timing details will be described in more detail below.

Figure 4:
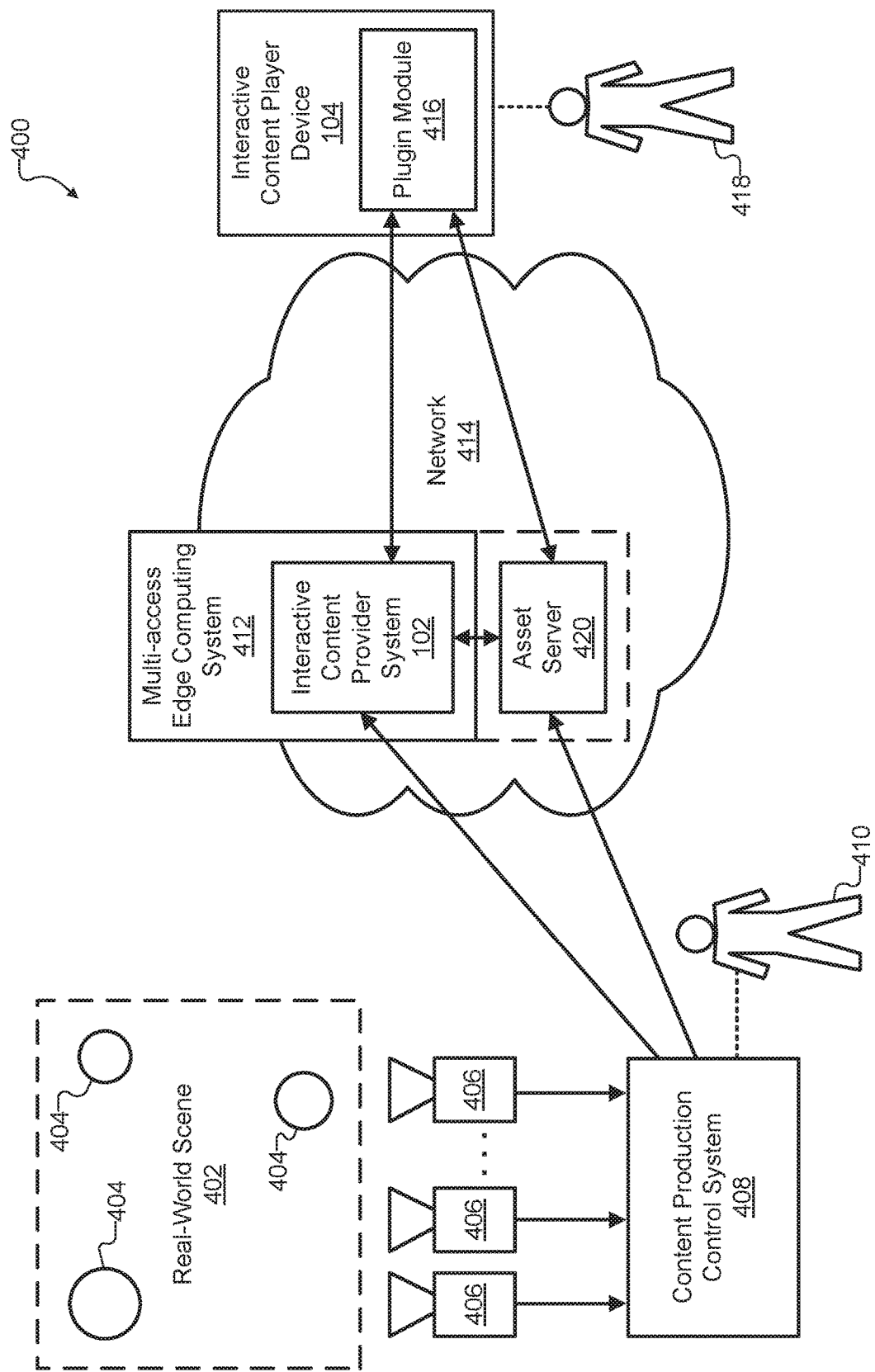
FIG. 4 shows an illustrative configuration in which the interactive content delivery system of FIG. 1 may interoperate to perform interactive content delivery within a live video stream according to embodiments described herein.

FIG. 4 shows an illustrative configuration 400 in which delivery system 100 (e.g., provider system 102 and player device 104) may interoperate (e.g., with one another and/or with other components) to perform interactive content delivery within a live video stream according to principles described herein. Specifically, as shown, configuration 400 depicts a real-world scene 402 that includes various objects 404 and that is captured by one or more cameras 406 that interoperate with a content production control system 408 operated by at least one production operator 410. Media content is provided by the content production control system 408 to an implementation of provider system 102 that may be implemented within a multi-access edge computing (MEC) system 412 integrated on a network 414 providing data communication services to an implementation of player device 104. Player device 104 may execute a plugin module 416 configured to process data received from provider system 102 and to present content to, and provide a user interface for, a user 418 of player device 104. Additionally, plugin module 416 may be configured to retrieve data that is not received from provider system 102 from other data sources such as from an asset server 420 that may integrated within network 414 together with MEC system 412, or that may be further implemented by MEC system 412 together with provider system 102. Each of the components illustrated in configuration 400 will now be described in more detail in the context of how delivery system 100 (e.g., provider system 102 and player device 104) interoperate within the configuration to provide interactive content delivery within a live video stream.

Real-world scene 402 may be implemented as any type of indoor or outdoor scene having any size or other characteristics as may serve a particular implementation. For instance, in one example, real-world scene 402 may be a relatively large event venue such as a playing field where a sporting event is taking place, a stage where a concert or other such event is being performed, or another suitable scene where an ongoing event is being captured so as to be recorded and/or presented live to people who are not present at the scene (e.g., people such as user 418). In these examples, imagery for a large number of objects 404 (e.g., a large number of people and/or other suitable subjects participating in the event) may be captured concurrently. Conversely, in another example, real-world scene 402 may be a studio setting where a smaller number of objects 404 (e.g., a single object 404) may be included within the real-world scene for the purpose of generating and/or updating volumetric models of the objects that are to be presented to people (e.g., such as user 418) who may be experiencing an extended reality world that includes the objects.

A few objects 404 are shown to be present at real-world scene 402. While objects 404 are depicted as differently-sized circles, these objects will be understood to represent various types of objects that may be found at a particular real-world scene and may be of interest to end consumers of the captured data such as user 418. For instance, objects 404 may represent people, props, animals, vehicles, inanimate objects, and so forth. More particularly, in an example involving a real-world scene 402 that is a basketball stadium at which a professional basketball game is taking place, objects 404 may include the players, the referees, the coaches, the basketball, the basketball standards (e.g., each including a backboard, rim, net, and supportive structure), fans in the background, and so forth. In some examples, objects 404 may be targets for volumetric modeling or other types of image processing.

Cameras 406 may represent a set of one or more video cameras, still cameras, depth capture devices, infrared cameras, or other suitable types of cameras configured to capture real-world image and/or depth data to provide the data to content production control system 408 for processing and distribution. In some examples, different cameras 406 may be disposed at locations having different vantage points of real-world scene 402 to allow objects 404 to be captured from various angles and viewpoints. This may allow for a variety of different shots to be presented one at a time in a presentation of events occurring at the real-world scene (e.g., long shots and close up shots from different angles of a basketball game event, etc.) or, in certain examples, these different vantage points may allow for image and/or depth data to be combined to generate one or more volumetric models of one or more of objects 404. Image data and/or depth data captured by cameras 406 may be provided to content production control system 408 in any suitable way. For example, the captured data may be provided to content production control system 408 by way of direct communicative connections and/or by way of a network (e.g., a local area network set up at the site of real-world scene 402, network 414, etc.) which may implement and/or employ any suitable communication technologies, devices, media, protocols, or the like as may serve a particular implementation.

Content production control system 408 may be implemented as any type of computing system configured to receive and process captured data from cameras 406 in any suitable manner. In some examples, content production control system 408 may be implemented by one or more servers localized at the site of real-world scene 402. For instance, in examples where real-world scene 402 includes a professional basketball game or another such sporting event, a production truck parked at the site of the sporting event may include video processing equipment implementing content production control system 408. In other examples, content production control system 408 may be implemented using distributed computing systems (e.g., MEC system 412, a cloud-computing system, etc.) or other suitable computing systems. Upon receiving captured data from cameras 406, content production control system 408 may perform image processing (e.g., volumetric modeling, image enhancement, etc.), image augmentation (e.g., to overlay text and/or graphics onto the captured imagery, to insert statistical graphics, etc.), video transcoding, data multiplexing, data packaging, data transmission or streaming, and/or other such services as may serve a particular implementation. Services and processes performed by content production control system 408 may be managed and controlled by one or more people involved in content creation such as production operator 410. Additionally, in certain examples, production operator 410 may oversee when a live presentation of events at real-world scene 402 is to be temporarily replaced by or augmented by other media content. For example, markers designating gaps or augmentation periods in the video presentation (e.g., ad breaks, half-time shows, etc.) may be generated by content production control system 408 at times designated or otherwise managed by production operator 410. In some examples, production operator 410 may manage such markers by way of a content creation interface platform configured to allow production operator 410 to author and manage different types of experiences to be provided during the gaps or augmentation periods in the video presentations.

Figure 5:
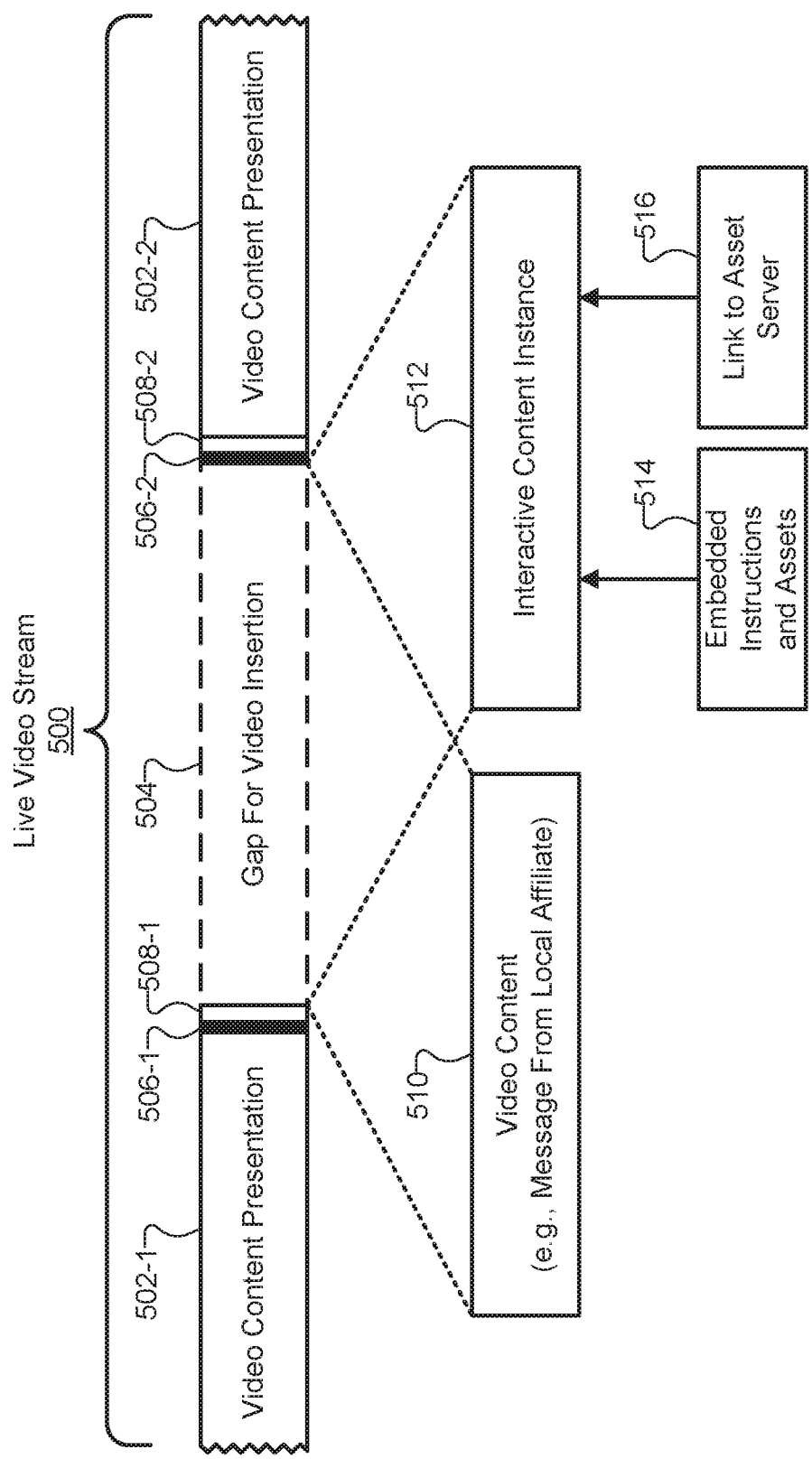
FIGS. 5-6 show illustrative live video streams within which interactive content is delivered according to embodiments described herein.
Figure 6:
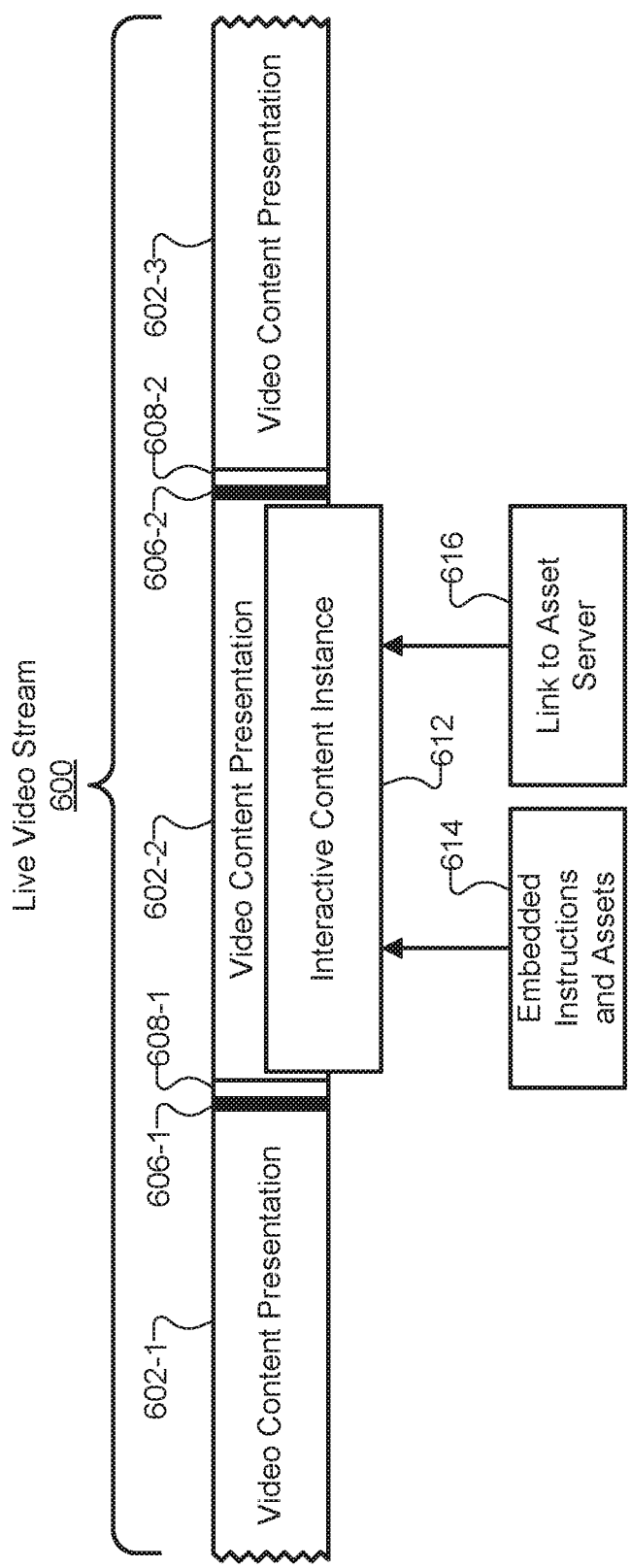

To illustrate these gaps and augmentations periods, FIGS. 5-6 show examples of live video streams within which interactive content is delivered according to principles described herein. Specifically, FIG. 5 shows a live video stream 500 in which a video content presentation 502 (e.g., including a first part 502-1 and a second part 502-2) is temporarily replaced by other media content during a designated gap 504. Similarly (and using similar reference numbers), FIG. 6 shows a live video stream 600 in which a video content presentation 602 (e.g., including a first part 602-1, a second part 602-2, and a third part 602-3) is temporarily augmented by other media content that is overlaid onto the video content presentation during an augmentation period corresponding to part 602-2 of video content presentation 602.

In certain examples, live video streams 500 and/or 600 may be implemented as HLS video streams depicting a real-time representation of a real-world event (e.g., the basketball game or other examples mentioned above) taking place at real-world scene 402 (e.g., a basketball stadium or other event venue). For example, these HLS video streams may be generated by content production control system 408 and provided to (e.g., transmitted to, retrieved by, etc.) provider system 102 in certain examples, or may be generated by provider system 102 based on raw data provided by content production control system 408. In either case, the HLS video stream may be considered to be accessed by provider system 102.

Various event markers 506 and 606 are shown to be included within live video streams 500 and 600, respectively. Specifically, a first event marker 506-1 is shown prior to gap 504 of live video stream 500 and a second event marker 506-2 is shown subsequent to gap 504. Similarly, a first event marker 606-1 is shown prior to the augmentation period of part 602-2 of the video content presentation of live video stream 600 and a second event marker 606-2 is shown subsequent to the augmentation period. In certain examples (e.g., when live video streams 500 and/or 600 are implemented as HLS video streams) the first and second event markers 506 and 606 are formatted in accordance with an ANSI/SCTE-35 standard for inline video cueing. As described above, use of these established HLS and ANSI/SCTE-35 standards (or other suitable standards) may provide various compatibility and other benefits to implementations of delivery system 100.

Event markers may be inserted into live video streams (e.g., by content production control system 408 under direction of production operator 410) to signal time periods when video content presentations carried by the live video streams may be replaced or augmented by other media content. The other media content may be any content as may serve a particular implementation. For example, as shown in FIG. 5, a conventional use of ANSI/SCTE-35 markers may be to replace, during gap 504 between event markers 506, video content presentation 502 with additional video content such as video content 510. In such conventional uses, video content 510 may represent a message from a local affiliate station facilitating broadcasting of video content presentation 502 (e.g., a local advertisement inserted into a national broadcast, etc.) or another non-interactive video that is to be inserted into the video content presentation for any suitable reason.

In contrast, as another example enabled by methods and systems described herein, the media content presented during gap 504 may be interactive. For instance, as shown, an interactive content instance 512 such as a video game, extended reality asset, or the like may be presented during gap 504 instead of non-interactive media content like video content 510. In this way, an end user may have the opportunity (e.g., during an ad break of the basketball game example when a timeout is occurring) to play a game or enjoy other interactive content rather than being presented with additional video content that may be less engaging to the user (e.g., an advertisement for a local store in the user's area). In this way, the user's interest may be better retained even during slow points in the video content presentations (e.g., timeouts or half-times of sporting events, intermissions of dramatic or musical events, etc.). As mentioned above, data representative of an interactive content instance may be embedded directly within a live video stream or stored elsewhere and linked to within the live video stream. To illustrate, FIG. 5 shows embedded instructions and assets 514, as well as a link 516 to an asset server, that may each be included within or used to represent interactive content instance 512. It will be understood that some examples may use embedded instructions and assets 514 alone, other examples may use one or more links 516 to the asset server alone, and still other examples may use a combination of embedded instructions and assets 514 and one or more links 516 to represent interactive content instance 512.

While FIG. 5 illustrates gap 504 during which the other media content (e.g., video content 510 or interactive content instance 512) temporarily replaces video content presentation 502 (e.g., between event markers 506), FIG. 6 illustrates an alternative type of implementation during which the other media content temporarily augments video content presentation 602 (e.g., during part 602-2 between event markers 606). Specifically, as shown, an interactive content instance 612 (which may include or be composed of embedded instructions and assets 614 and/or one or more links 616 to an asset server similar to those described above in relation to FIG. 5) is depicted as overlaying part 602-2 of video content presentation 602 between event markers 606. As will be illustrated and described in more detail below, this type of implementation may allow the user to play a game or to experience other interactive content at the same time (and on the same presentation display) as the user is experiencing video content presentation 602.

Immediately subsequent to each event marker 506 and 606 in FIGS. 5 and 6, respective transitions 508 or 608 are shown. Specifically, in FIG. 5, a transition 508-1 is shown to follow event marker 506-1 to transition from part 502-1 of video content presentation 502 into the other media content that temporarily replaces video content presentation 502 (e.g., video content 510 or interactive content instance 512). Thereafter, a transition 508-2 is shown to follow event marker 506-2 to transition from the other media content to part 502-2 of video content presentation 502. Similarly, in FIG. 6, a transition 608-1 is shown to follow event marker 606-1 to transition from part 602-1 of video content presentation 602 into part 606-2, during which other media content (e.g., interactive content instance 612) temporarily augments video content presentation 602. Thereafter, a transition 608-2 is shown to follow event marker 606-2 to transition from part 602-2 and the augmented presentation of interactive content instance 612 to part 602-3 of video content presentation 602.

Each of transitions 508 and 608 may be implemented as any suitable types of transitions including an immediate transition or jump cut, a fade or wipe transition, or any other transition as may serve a particular implementation. In some examples, data representative of transitions such as transitions 508 and/or 608 may be explicitly included in live video streams such as live video streams 500 and 600, while, in other examples, transitioning may be automatically performed by interactive content player devices in response to event markers and no explicit transition-related data may be included in the live video streams.

In either case, an interactive content player device such as player device 104 may be considered to transition from presenting video content represented in the live video stream to executing the interactive content instance in response to the detecting of the first event marker. For certain live video streams such as live video stream 500 of FIG. 5, the interactive content player device may be directed to perform the transitioning such that the interactive content instance (e.g., interactive content instance 512) replaces the video content presentation (e.g., video content presentation 502) in a manner that allows only one of the interactive content instance and the video content to be presented to the user at a time. For other live video streams such as live video stream 600 of FIG. 6, the interactive content player device may be directed to perform the transitioning such that the interactive content instance (e.g., interactive content instance 612) is overlaid onto a presentation of the video content (e.g., video content presentation 602 at part 602-2) in a manner that allows both the interactive content instance and the video content to be presented to the user concurrently.

Returning to FIG. 4, MEC system 412 is shown in configuration 400 to implement provider system 102 and to be communicatively coupled to player device 104 by way of network 414. MEC system 412 may be implemented by a computing system (e.g., a standalone server or set of servers at a single site, etc.) that includes a respective set of computing resources, that is accessible to multiple client devices separate from MEC system 412 such as player device 104, and that is configured to perform processing and data services for the client devices (e.g., including player device 104). While other types of multi-access servers such as cloud-servers may be coupled to client devices with a relatively large degree of latency, MEC system 412 may advantageously be implemented within a provider network portion of network 414 so as to be near the edge of network 414 where player device 104 connects to the network. In this way, MEC system 412 may provide data services for player device 104 with relatively low latency and high responsiveness. MEC system 412 may include a set of co-located computing resources (e.g., processors, CPUs, GPUs, memory, communication resources, etc.) such that the computing resources all communicate with player device 104 with a similar transport latency and such that MEC system 412 may appear to player device 104 as a single, discrete entity.

MEC system 412 may perform various low-latency data services for player device 104 including video encoding services, asset delivery services, and so forth. Moreover, in examples such as illustrated in configuration 400 where MEC system 412 implements provider system 102, the computing resources of MEC system 412 may also perform any of the operations described herein as being performed by provider system 102. For example, MEC system 412 may access a live video stream (e.g., live video stream 500 of FIG. 5, live video stream 600 of FIG. 6, etc.) by obtaining the live video stream from content production control system 408 or by generating the live video stream based on data received from content production control system 408, and then may perform any of the operations described above in relation to method 200. For instance, MEC system 412 may transmit the accessed live video stream to player device 104 (e.g., to plugin module 416 of player device 104 in particular) and may transmit, within the live video stream, the first and second event markers (e.g., event markers 506-1 and 506-2 or event markers 606-1 and 606-2). Additionally, MEC system 412 may provide the executable data object to player device 104 either directly or by reference. For example, the providing of the executable data object may include receiving a request for the executable data object from plugin module 416 via network 414. The providing may further include transmitting the executable data object to plugin module 416 via network 414 and in response to the request.

In some examples, the executable data object may be stored and transmitted in a flattened executable form preconfigured for storage in memory of player device 104 during execution of the interactive content instance. That is, the form in which data is stored and managed prior to being provided to player device 104 may by the same binary, executable form in which the data will ultimately exist in memory of player device 104, rather than being structured in a standard form that would require player device 104 to unpack, decompress, decode, render, and/or otherwise process the data to get it into the flattened executable form. An ingest pipeline may be used to pre-process and test data in this way and prepare the data to be provided to interactive content player devices on demand. Additionally, executable data objects that have been pre-generated in this way may be managed in a suitable type of data store that may be drawn from or linked to as provider system 102 provides executable data objects in any of the ways described herein.

For example, asset server 420 may represent one example of this type of data store. Asset server 420 may implement some or all of the ingest pipeline that processes data assets (e.g., video games, extended reality objects, scenes, or textures, etc.) into the flattened executable form in which they will be provided to player device 104. Asset server 420 may also include data storage for maintaining these and other suitable data objects. Accordingly, provider system 102 may access data from asset server 420 when embedding executable data objects within a live video stream (e.g., such as in the example of interactive content instance 512 when including embedded instructions and assets 514 or the example of interactive content instance 612 when including embedded instructions and assets 614). Additionally or alternatively, provider system 102 may link to data stored at asset server 420 when indirectly referencing executable data objects within a live video stream (e.g., such as in the example of interactive content instance 512 when including link 516 to the asset server or the example of interactive content instance 612 when including link 616 to the asset server).

Network 414 may represent various data communication networks or parts of networks used to enable data communication between client devices (e.g., including player device 104) and multi-access servers (e.g., MEC system 412). To this end, network 414 may implement or employ any suitable communication technologies, devices, media, protocols, or the like as may serve a particular implementation. In some examples, network 414 may include a provider network and/or additional networks outside of the provider network (e.g., external networks associated with the Internet).

A provider network included within network 414 may be implemented as a provider-specific wired or wireless communications network (e.g., a cellular network used for mobile phone and data communications, a 5G network or network of another suitable technology generation, a cable or satellite carrier network, a mobile telephone network, a traditional telephone network, etc.), and may be operated and managed by a provider entity such as a mobile network operator (e.g., a wireless service provider, a wireless carrier, a cellular company, etc.). The provider of the provider network may own or control all of the elements necessary to deliver communications services to users of user equipment devices such as player device 104, including radio spectrum allocation, wireless network infrastructure, back haul infrastructure, customer care, provisioning of devices, and so forth. Along with the provider network, network 414 may further include elements of various interconnected networks that are outside of any provider network and outside the control of any provider of such a provider network. Elements of the Internet, a wide area network, a content delivery network, and/or any other suitable network or networks are examples of other elements that may be included within network 414. Any of these provider or non-provider networks or network elements may provide data delivery between MEC system 412 and player device 104, as well as, in certain implementations, access to alternative multi-access server resources (e.g., cloud servers providing a similar function but longer latency than MEC system 412).

Player device 104 may be implemented as any type of computing device used by user 418 to experience and engage both with video content that may be delivered via the live video stream, as well with interactive content that may further be delivered via the live video stream. For example, in certain implementations, user 418 may experience both the video content presentation and the interactive content instance in extended reality, and player device 104 may be implemented by a head-mounted extended reality device (e.g., a virtual reality headset, an augmented reality headset, etc.). In these examples, user 418 may experience the video content presentation from a virtual lounge (e.g., a player's lounge or VIP lounge for the basketball game example), a virtual theater (e.g., a virtual move theater or home theater with avatars of other users), or another virtual location. Then, when the interactive content instance is transitioned to, user 418 may use controls of the extended reality device (e.g., a game controller, etc.) to interactive with the content (e.g., shoot the basketball in the example of a free-throw shooting mini-game).

In other implementations, user 418 may experience both the video content presentation and the interactive content instance in ways that do not necessarily involve extended reality technology. For instance, player device 104 may be implemented by a smart television, a personal computer screen, a mobile device (e.g., a smartphone, a tablet device, etc.), or another such device that user 418 may use to watch the video presentation. When the interactive content instance is transitioned to, user 418 may use any suitable user input controls (e.g., a remote control device for the smart television, a mouse and/or keyboard for the personal computer, the touch screen of a mobile device, etc.) to provide the interactive user input for the interactive content instance.

Plugin module 416 may be implemented on resources of player device 104 and may be configured to trigger when metadata such as the event markers described above are recognized by a video player presenting the video content presentation. Plugin module 416 may be a relatively lightweight software module (e.g., requiring relatively minimal resources, associated with quick and easy installation, etc.) that is configured to operate with various types of video players and/or on various types of platforms (e.g., various different computer operating systems, types of interactive content player devices, etc.). In some examples, plugin module 416 may be provided by provider system 102 such as being downloadable from provider system 102, being configured to interoperate with provider system 102, or otherwise being closely associated with the customized live video streams that provider system 102 provides.

As has been mentioned, player device 104 may be configured to execute plugin module 416 to perform the detecting of the first event marker, the accessing of the executable data object, the executing of the interactive content instance, the detecting of the second event marker, and the discontinuing of the executing of the interactive content instance. These operations may be performed by plugin module 416 in any of the ways described herein. For example, with regard to the accessing of an executable data object, plugin module 416 may transmit, to MEC system 412 via network 414, a request for the executable data object, and may receive (e.g., from MEC system 412 via network 414 and in response to the request) the executable data object in the flattened executable form described above. As mentioned above with respect to live video streams 500 and 600, one or more executable data objects may be received directly (e.g., embedded within a live video stream) or by reference (e.g., linked to within a live video stream). As such, the accessing of the executable data object may include: 1) loading at least a portion of the data representative of the interactive content instance from data embedded in the live video stream, 2) retrieving at least a portion of the data representative of the interactive content instance from asset server 420 based on a link included within the live video stream, or 3) a combination of these.

Figure 7:
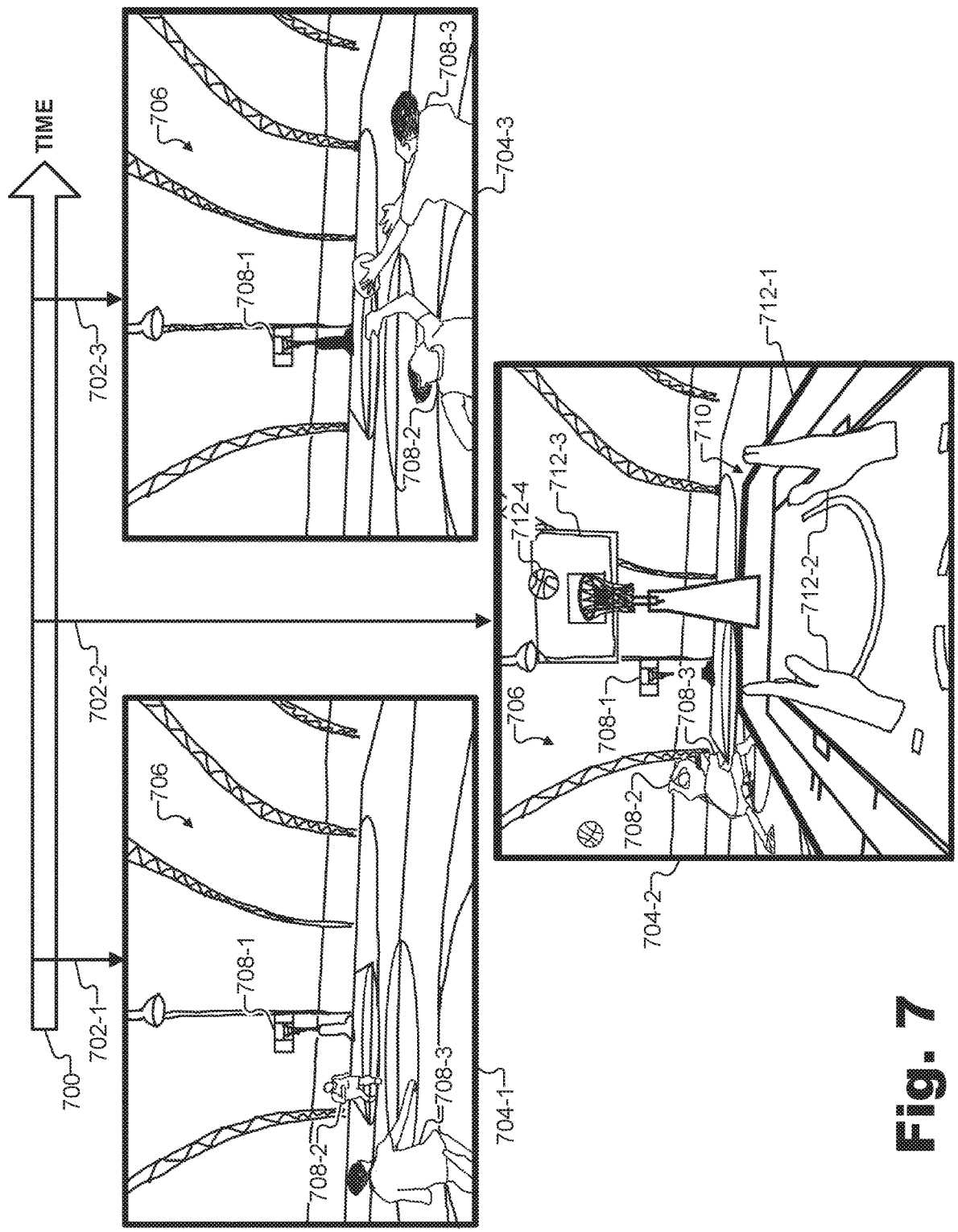
FIGS. 7-8 show illustrative timelines depicting timing of when various types and instances of media content may be presented to a user according to embodiments described herein.
Figure 8:
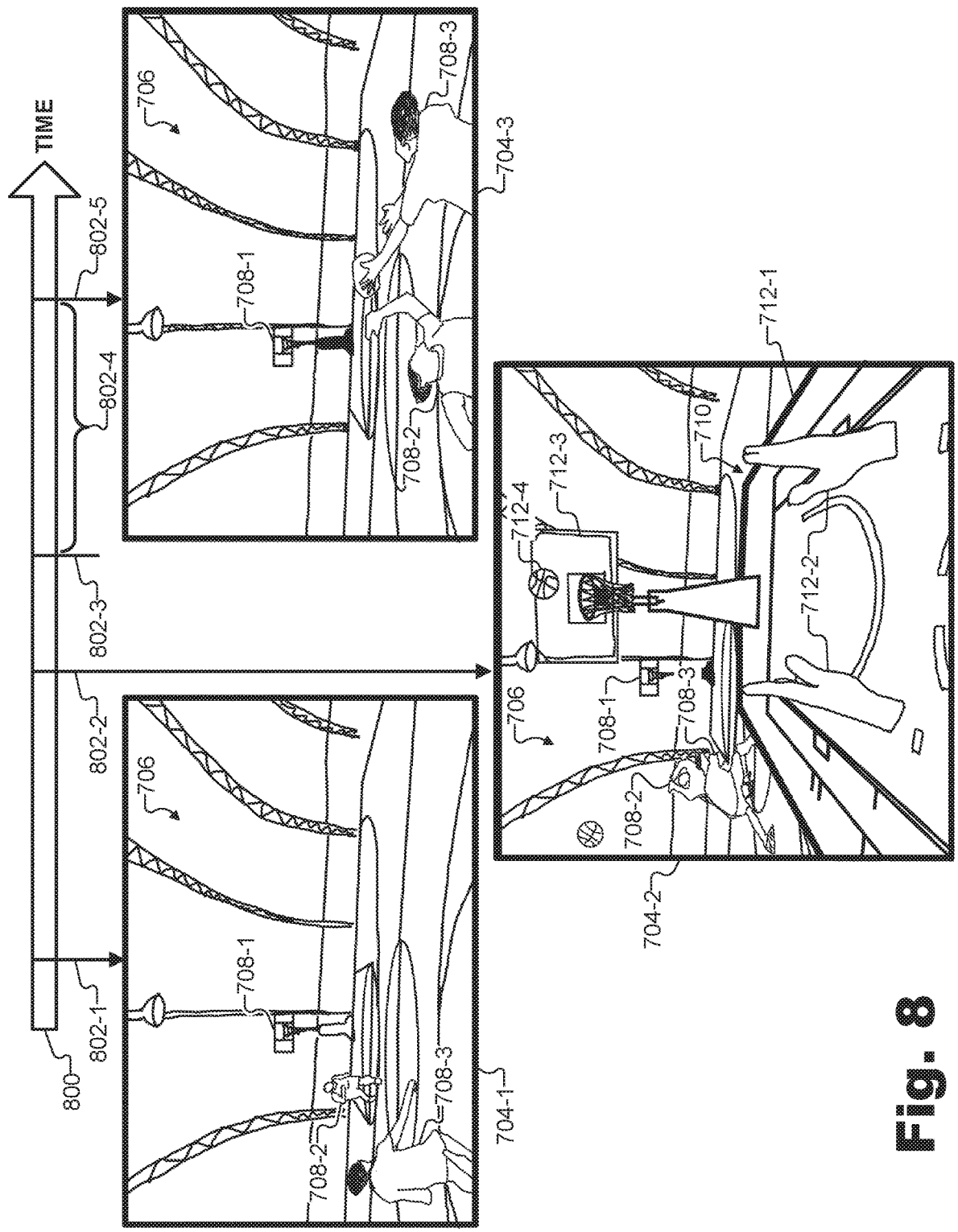

FIGS. 7-8 show illustrative timelines depicting timing of when various types and instances of media content may be presented to a user (e.g., user 418 of player device 104 described above). More specifically, FIG. 7 illustrates a timeline 700 designating several times 702 (e.g., times 702-1 through 702-3), while FIG. 8 illustrates a timeline 800 designating several times 802 (e.g., times 802-1 through 802-5). Both FIGS. 7 and 8 illustrate three snapshots 704 (e.g., snapshots 704-1 through 704-3) depicting content presented to the user in a particular example that includes video content related to a basketball game and interactive content related to a free-throw shooting mini-game. However, as will be described, the timing of when these snapshots are presented is different in the examples of FIG. 7 and FIG. 8. Snapshots 704 will now be described, followed by a description of how the time varies in FIGS. 7 and 8.

A first snapshot 704-1 is shown to depict a real-world scene 706 that includes a basketball court having various objects 708. For instance, from a vantage point of a camera (not explicitly shown) positioned near one end of the court, snapshot 704-1 shows a basketball standard 708-1 at the other end of the court, along with a player 708-2 and a player 708-3. Players 708-2 and 708-3 will be understood to be engaged in a basketball game that may be depicted in video content represented within a live video stream that is provided to the interactive content player device of a user wishing to view the basketball game. While only two players in a practice gym (e.g., without visible spectators, etc.) are shown for clarity in snapshots 704, it will be understood that a professional game with ten players, referees, spectators, and other objects within a large arena may be depicted in other examples. Additionally, it will be understood that the basketball game of real-world scene 706 is only illustrative, and that various other types of sporting events (e.g., football games, soccer games, baseball games, golf matches, car or animal races, etc.), events not associated with sports (e.g., musical concerts, large gatherings at real-world locations, plays or other dramatic events), and live streams that are not necessarily associated with events (e.g., web cameras monitoring an area of interest, closed-circuit security cameras, etc.) may be depicted instead of the basketball game in various other examples.

A second snapshot 704-2 also depicts real-world scene 706, including each of objects 708 as the basketball game continues, but also shows elements of an interactive content instance 710 that is overlaid onto the video content presentation so that the user may engage in interactive content instance 710 while also continuing to view (at least to some degree) what is happening in the basketball game at real-world scene 706. The illustrated example may represent an implementation such as described above in relation to FIG. 6, for example, where the interactive content instance is overlaid onto the video content presentation rather than completely replacing the video content presentation as described above in relation to FIG. 5.

In this example, interactive content instance 710 is shown to be an interactive game to be played by the user of the interactive content player device (e.g., user 418 of player device 104). The interactive game allows the user to attempt, by way of interactive input provided by the user, to direct a virtual object to a target. The interactive game may also provide an indication of whether the user successfully directed the virtual object to the target. More specifically, as shown in snapshot 704-2, the interactive game of interactive content instance 710 is a free-throw shooting mini-game involving several virtual objects 712 (e.g., a virtual floor 712-1, virtual avatar hands 712-2, a virtual basketball standard 712-3, a virtual basketball 712-4, etc.). The user may provide interactive input in any suitable way (e.g., including any of the ways described herein) to cause virtual avatar hands 712-2 to shoot (e.g., launch, throw, etc.) virtual basketball 712-4 toward virtual basketball standard 712-3 in an effort to make a basket (e.g., cause virtual basketball 712-4 to go through the rim and net). When this target is successfully achieved (i.e., when the user makes a basket), an indication may be given that the user successfully directed the virtual object to the target. For example, the indication may involve a crowd cheering, confetti falling, presenting a score (e.g., representing baskets made, representing a ratio of baskets made to baskets missed, etc.), presenting a sound to indicate success, granting a virtual reward (e.g., virtual points or money for the game, a virtual trophy, etc.), fading to black to end the mini-game or initiating a different interactive content instance, or any other indication as may serve a particular implementation.

Virtual physics may be simulated as virtual basketball bounces off virtual floor 712-1 and/or elements of virtual basketball standard 712-3 (e.g., bouncing off the backboard or rim, swishing the net, etc.). Additionally, though it appears in this example that virtual floor 712-1 is floating above the real basketball court of real-world scene 706 such that virtual basketball 712-4 could roll off virtual floor 712-1 into real-world scene 706, invisible virtual walls may extend upwards from the edges of virtual floor 712-1 such that virtual basketball 712-4 may bounce off these virtual walls and remain within the designated virtual playing area.

It will be understood that the free-throw shooting mini-game of interactive content instance 710 is provided as just one example of an interactive content instance, and that a wide range of interactive content instances may be provided in accordance with methods and systems described herein. First, other sports besides basketball may involve similar object-launching games (e.g., hit a target with a football or baseball, score a hockey goal without getting blocked by a virtual goalie, drive a golf ball onto a virtual green or putt the golf ball into the hole, etc.), or other games on the theme of the event (e.g., follow the puck in a three-card monte style guessing game during a hockey game, shoot a t-shirt cannon or catch a t-shirt shot from a t-shirt cannon, etc.). Other types of interactive content instances may also be mini-games but may or may not be directly related to the event (e.g., graffiti a wall, "kiss cam" or other Jumbotron experiences, air hockey, Plinko, ball and cups, etc.). In any of these examples, a leaderboard may be used to indicate notable players (e.g., winners, etc.) of the mini-game.

In certain implementations, interactive content instances may include games that are more involved than the relatively simple mini-games described above. For instance, fully immersive virtual reality worlds and linear 2D/3D content may be provided on demand as part of the interactive content instance. Volumetric content, multi-player games, fully rendered computer-generated imagery (CGI) environments, merchandising content for one-click purchase of memorabilia, and/or other such advanced content may all be included as part of certain examples of interactive content instances.

In certain examples in which the user is viewing the video content presentation in an extended reality world (e.g., in a virtual lounge or theater as mentioned above, etc.), the interactive content instance may include changing the extended reality world in some way. For example, objects may be added to the user's environment (e.g., a recognizable person or object, a product placement, etc.), data streams or tickers may be included on the video presentation (e.g., social media feeds, stock tickers, sport score tickers, etc.), non-entertainment programs (e.g., word processors, etc.) may be provided, or many other types of content may be provided to the user as may serve a particular implementation. In certain examples, content may be provided to target user experiences to the platform the user is using, to the real-world geolocation where the user is located, or to other such real-time conditions. In some of these advanced examples, it is noted that additional cueing may be implemented that may go beyond the ANSI/SCTE-35 markers described herein (e.g., beyond the first and second event markers used to designate timeouts or half-time in the sporting-event examples described above).

A third snapshot 704-3 is shown to depict real-world scene 706 after the executing of interactive content instance 710 has been discontinued (i.e., such that the overlaid virtual elements are no longer shown). Here again, players 708-2 and 708-3 are shown together with basketball standard 708-1 from the same vantage point in the video content presentation as the basketball game continues (e.g., after half time, after the timeout or ad break, etc.).

Timeline 700 of FIG. 7 illustrates a first example of timing for when the interactive content instance is executed and later discontinued. Specifically, in this example, the discontinuing of the executing of interactive content instance 710 is performed by transitioning from the executing of interactive content instance 710 to presenting only the video content presentation directly in response to (i.e., immediately subsequent to) the detecting of the second event marker. For example, as shown, snapshot 704-1 shows that the video content is being presented alone at time 702-1. At (or slightly before) time 702-2, the first event marker may be detected such that player device 104 may transition to executing interactive content instance 710 and the user may play the mini-game as shown in snapshot 704-2. Then, at (or slightly before) time 702-3, the second event marker may be detected such that player device 104 may transition away from executing interactive content instance 710 and back to presenting the video content alone, as shown in snapshot 704-3. In this example, in other words, the transition away from and the discontinuation of interactive content instance 710 may be performed directly in response to detecting the second event marker (e.g., similar to how a message from a local sponsor might end and the national broadcast would again be shown in the conventional example described above involving video content 510).

In contrast, timeline 800 of FIG. 8 illustrates a different example of timing for when the interactive content instance is executed and later discontinued. In this example, the discontinuation of the executing of interactive content instance 710 is still performed subsequent to the detecting of the second event marker, but the execution of interactive content instance 710 persists for a time rather than being performed directly in response to the detection of the second event marker. Specifically, for example, player device 104 may be configured or directed (e.g., by instructions within the live video stream) to monitor, in response to the detecting of the second event marker and as the executing of the interactive content instance persists, for an indication by the user that the executing of interactive content instance 710 is to be discontinued. During the monitoring, player device 104 may then detect the indication by the user that the executing of interactive content instance 710 is to be discontinued, and, in response, may transition from the executing of interactive content instance 710 to presenting video content represented in the live video stream. The indication by the user may include direct and intentional user input (e.g., input indicating that the user wishes to close out the game) or may be incidental to the user's experience (e.g., the user reaches a threshold number of achievements such as making five free throws, the user moves within the virtual world such that a particular interactive content instance is no longer in view or relevant to the user's experience, etc.).

To illustrate, snapshot 704-1 in FIG. 8 shows, similar to FIG. 7, that the video content is being presented alone at time 802-1. Also similar to timeline 700, timeline 800 shows that at (or slightly before) time 802-2, the first event marker may be detected such that player device 104 may transition to executing interactive content instance 710 and the user may play the mini-game as shown in snapshot 704-2. However, when the second event marker is detected at time 802-3, the example of FIG. 8 diverges from the example described above with respect to FIG. 7. Rather than immediately transitioning back to the video presentation of snapshot 704-3 in response to the detection of the second event marker at time 802-3 (as was done at time 702-3 in the example of timeline 700), player device 104 persists in executing interactive content instance 710 (snapshot 704-2) throughout a time period 802-4 while player device 104 monitors for a user indication to discontinue the interactive content instance. Not until that user indication is detected at time 802-5 does player device 104 discontinue the executing of interactive content instance 710 and transition back to presenting the video content alone, as shown by snapshot 704-3. In this example, in other words, the transition away from (and the discontinuation of) interactive content instance 710 is not performed directly in response to detecting the second event marker, but, rather, is performed subsequent to the marker at a time indicated (e.g., intentionally or incidentally) by the user. In some examples, the discontinuation of interactive content instance 710 may be performed automatically when the interactive content instance 710 is complete or after a default amount of time (e.g., two minutes, etc.) even if no user indication is detected.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EE-PROM, any other memory chip or cartridge, or any other tangible medium from which a computer can read.

Figure 9:
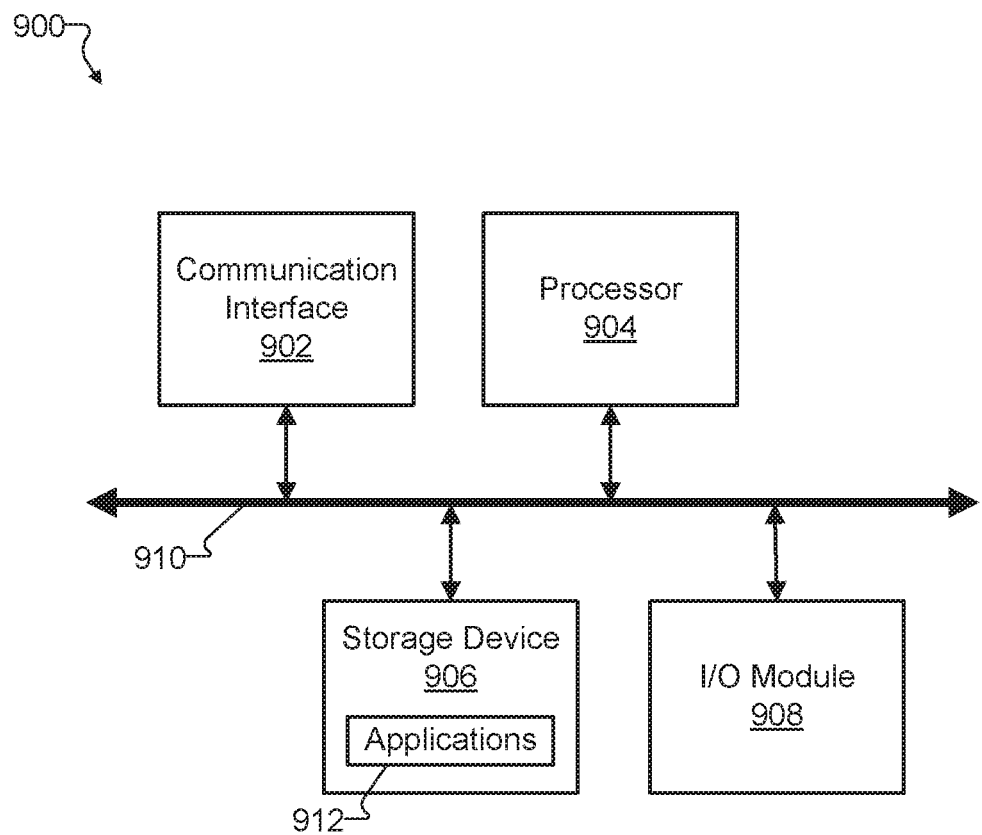
FIG. 9 shows an illustrative computing device according to embodiments described herein.

FIG. 9 shows an illustrative computing device 900 that may be specifically configured to perform one or more of the processes described herein. For example, computing system 900 may include or implement (or partially implement) an interactive content delivery system such as delivery system 100 or any component included therein (e.g., an interactive content provider system such as provider system 102, an interactive content player device such as player device 104, etc.), a content production control system such as content production control system 408, a MEC system such as MEC system 412, other systems implemented within MEC system 412 or elsewhere on a network such as asset server 420, or any other computing systems or devices described herein.

As shown in FIG. 9, computing system 900 may include a communication interface 902, a processor 904, a storage device 906, and an input/output (I/O) module 908 communicatively connected via a communication infrastructure 910. While an illustrative computing system 900 is shown in FIG. 9, the components illustrated in FIG. 9 are not intended to be limiting. Additional or alternative components may be used in other embodiments. Components of computing system 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit capable of processing data or interpreting, executing, and/or directing execution of one or more of the instructions, processes, and/or operations described herein. Processor 904 may direct execution of operations in accordance with one or more applications 912 or other computer-executable instructions such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 906. For example, data representative of one or more executable applications 912 configured to direct processor 904 to perform any of the operations described herein may be stored within storage device 906. In some examples, data may be arranged in one or more databases residing within storage device 906.

I/O module 908 may include one or more I/O modules configured to receive user input and provide user output. One or more I/O modules may be used to receive input for a single virtual experience. I/O module 908 may include any hardware, firmware, software, or combination thereof supportive of input and output capabilities. For example, I/O module 908 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing system 900. For example, one or more applications 912 residing within storage device 906 may be configured to direct processor 904 to perform one or more processes or functions associated with processor 108 of provider system 102 or processor 114 of player device 104. Likewise, memory 106 of provider system 102 and/or memory 112 of player device 104 may be implemented by or within storage device 906.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various illustrative embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   detecting, by an interactive content player device, a first event marker in a live video stream being transmitted by an interactive content provider system;
   accessing, by the interactive content player device in response to the detecting of the first event marker, an executable data object including data representative of an interactive content instance having a designated virtual area in which is presented a set of virtual objects, the set of virtual objects including a virtual floor object configured to bound the designated virtual area such that other virtual objects in the set remain above the virtual floor object;
   executing, by the interactive content player device based on the executable data object, the interactive content instance in accordance with interactive input provided by a user of the interactive content player device, the interactive content instance executed so as to be overlaid onto a presentation of video content that is represented in the live video stream and that depicts a floor plane distinct from the virtual floor object of the interactive content instance;
   detecting, by the interactive content player device during the executing of the interactive content instance, a second event marker in the live video stream; and
   discontinuing, by the interactive content player device subsequent to the detecting of the second event marker, the executing of the interactive content instance.

2. The method of claim 1, wherein:
   the live video stream is an HTTP live stream (HLS) video stream representing, in the video content, a real-time representation of a real-world event taking place at a real-world scene; and
   the first and second event markers in the HLS video stream are formatted in accordance with an ANSI/SCTE-35 standard for inline video cueing.

3. The method of claim 1, wherein the accessing of the executable data object includes at least one of:
   loading at least a portion of the data representative of the interactive content instance from data embedded in the live video stream; or
   retrieving at least a portion of the data representative of the interactive content instance from an asset server based on a link included within the live video stream.

4. The method of claim 1, wherein:
   the interactive content provider system is implemented by a multi-access edge computing (MEC) system communicatively coupled to the interactive content player device by way of a network; and
   the accessing of the executable data object includes:
      transmitting, to the MEC system via the network, a request for the executable data object, and
      receiving, from the MEC system via the network and in response to the request, the executable data object in a flattened executable form preconfigured for storage in memory of the interactive content player device during the executing of the interactive content instance.

5. The method of claim 1, wherein the interactive content instance is an interactive game to be played by the user of the interactive content player device.

6. The method of claim 5, wherein:
   the interactive game allows the user to attempt, by way of the interactive input provided by the user, to direct a virtual object to a target;
   the target is above the virtual floor object and the virtual object is configured to bounce off the virtual floor object; and
   the interactive game provides an indication of whether the user successfully directed the virtual object to the target.

7. The method of claim 1, further comprising:
   detecting, by the interactive content player device subsequent to the discontinuing of the executing of the interactive content instance, a third event marker in the live video stream; and
   transitioning, by the interactive content player device and in response to the detecting of the third event marker, from presenting the video content represented in the live video stream to executing an additional interactive content instance, the transitioning performed such that the additional interactive content instance replaces the presentation of the video content in a manner that allows only one of the additional interactive content instance and the video content to be presented to the user at a time.

8. The method of claim 1, further comprising:
  detecting, by the interactive content player device subsequent to the discontinuing of the executing of the interactive content instance, a third event marker in the live video stream; and
  transitioning, by the interactive content player device and in response to the detecting of the third event marker, from presenting the video content represented in the live video stream to executing an additional interactive content instance, the transitioning performed such that the additional interactive content instance is overlaid onto the presentation of the video content in a manner that allows both the additional interactive content instance and the video content to be presented to the user concurrently.

9. The method of claim 1, wherein the discontinuing of the executing of the interactive content instance is performed by:
  monitoring, in response to the detecting of the second event marker and as the executing of the interactive content instance persists, for an indication by the user that the executing of the interactive content instance is to be discontinued;
  detecting, during the monitoring, the indication by the user that the executing of the interactive content instance is to be discontinued; and
  transitioning, in response to the detecting of the indication by the user, from the executing of the interactive content instance to presenting the video content represented in the live video stream.

10. The method of claim 1, embodied as computer-executable instructions on at least one non-transitory computer-readable medium.

11. A method comprising:
  transmitting, by an interactive content provider system, a live video stream to an interactive content player device;
  transmitting, by the interactive content provider system, a first event marker in the live video stream, the first event marker configured to direct the interactive content player device to access an executable data object including data that is representative of an interactive content instance having a designated virtual area in which is presented a set of virtual objects, the set of virtual objects including a virtual floor object configured to bound the designated virtual area such that other virtual objects in the set remain above the virtual floor object;
  providing, by the interactive content provider system, the executable data object to the interactive content player device to allow the interactive content player device to execute the interactive content instance based on the executable data object and in accordance with interactive input provided by a user of the interactive content player device, the interactive content instance executed so as to be overlaid onto a presentation of video content that is represented in the live video stream and that depicts a floor plane distinct from the virtual floor object of the interactive content instance; and
  transmitting, by the interactive content provider system while the interactive content player device executes the interactive content instance, a second event marker in the live video stream, the second event marker configured to direct the interactive content player device to discontinue the executing of the interactive content instance.

12. The method of claim 11, further comprising accessing, by the interactive content provider system, an HTTP live stream (HLS) video stream representing, in the video content, a real-time representation of a real-world event taking place at a real-world scene;
  wherein:
    the live video stream transmitted by the interactive content provider system is the HLS video stream; and
    the first and second event markers transmitted in the HLS video stream are formatted in accordance with an ANSI/SCTE-35 standard for inline video cueing.

13. The method of claim 11, wherein the providing of the executable data object includes at least one of:
  embedding, within the live video stream, at least a portion of the data representative of the interactive content instance; or
  including, within the live video stream, a link to an asset server storing at least a portion of the data representative of the interactive content instance.

14. The method of claim 11, wherein:
  the interactive content provider system is implemented by a multi-access edge computing (MEC) system communicatively coupled to the interactive content player device by way of a network; and
  the providing of the executable data object includes:
    receiving, by the MEC system from the interactive content player device via the network, a request for the executable data object, and
    transmitting, by the MEC system to the interactive content player device via the network and in response to the request, the executable data object in a flattened executable form preconfigured for storage in memory of the interactive content player device during the executing of the interactive content instance.

15. The method of claim 11, wherein:
  the interactive content instance is an interactive game to be played by the user of the interactive content player device;
  the interactive game allows the user to attempt, by way of the interactive input provided by the user, to direct a virtual object to a target;
  the target is above the virtual floor object and the virtual object is configured to bounce off the virtual floor object; and
  the interactive game provides an indication of whether the user successfully directed the virtual object to the target.

16. An interactive content player device comprising:
  a processor configured to:
    detect a first event marker in a live video stream being transmitted by an interactive content provider system;
    access, in response to the detecting of the first event marker, an executable data object including data that is representative of an interactive content instance having a designated virtual area in which is presented a set of virtual objects, the set of virtual objects including a virtual floor object configured to bound the designated virtual area such that other virtual objects in the set remain above the virtual floor object;
    execute, based on the executable data object, the interactive content instance in accordance with interactive input provided by a user of the interactive content player device, the interactive content instance executed so as to be overlaid onto a presentation of video content that is represented in the live video stream and that depicts a floor plane distinct from the virtual floor object of the interactive content instance;

detect, during the executing of the interactive content instance, a second event marker in the live video stream; and discontinue, subsequent to the detecting of the second event marker, the executing of the interactive content instance.

17. The interactive content player device of claim 16, wherein:

the live video stream is an HTTP live stream (HLS) video stream representing, in the video content, a real-time representation of a real-world event taking place at a real-world scene; and the first and second event markers in the HLS video stream are formatted in accordance with an ANSI/SCTE-35 standard for inline video cueing.

18. The interactive content player device of claim 16, wherein the accessing of the executable data object includes at least one of:

loading at least a portion of the data representative of the interactive content instance from data embedded in the live video stream; or retrieving at least a portion of the data representative of the interactive content instance from an asset server based on a link included within the live video stream.

19. The interactive content player device of claim 16, wherein:

the interactive content provider system is implemented by a multi-access edge computing (MEC) system communicatively coupled to the interactive content player device by way of a network; and the accessing of the executable data object includes:

transmitting, to the MEC system via the network, a request for the executable data object, and receiving, from the MEC system via the network and in response to the request, the executable data object in a flattened executable form preconfigured for storage in memory of the interactive content player device during the executing of the interactive content instance.

20. An interactive content provider system comprising:

a memory storing instructions; and a processor communicatively coupled to the memory and configured to execute the instructions to:

transmit a live video stream to an interactive content player device;

transmit a first event marker in the live video stream, the first event marker configured to direct the interactive content player device to access an executable data object including data that is representative of an interactive content instance having a designated virtual area in which is presented a set of virtual objects, the set of virtual objects including a virtual floor object configured to bound the designated virtual area such that other virtual objects in the set remain above the virtual floor object;

provide the executable data object to the interactive content player device to allow the interactive content player device to execute the interactive content instance based on the executable data object and in accordance with interactive input provided by a user of the interactive content player device, the interactive content instance executed so as to be overlaid onto a presentation of video content that is represented in the live video stream and that depicts a floor plane distinct from the virtual floor object of the interactive content instance; and transmit, while the interactive content player device executes the interactive content instance, a second event marker in the live video stream, the second event marker configured to direct the interactive content player device to discontinue the executing of the interactive content instance.

* * * * *